United States Patent
Carroll

(10) Patent No.: US 7,164,083 B1
(45) Date of Patent: Jan. 16, 2007

(54) ELECTRICAL OUTLET COVERING APPARATUS

(76) Inventor: Edgar Carroll, 3675 Lefever St., Cocoa, FL (US) 32926

(*) Notice: Subject to any disclaimer, the term of this patent is extended or adjusted under 35 U.S.C. 154(b) by 0 days.

(21) Appl. No.: 11/237,818

(22) Filed: Sep. 29, 2005

(51) Int. Cl.
*H05K 5/03* (2006.01)

(52) U.S. Cl. .......................... 174/67; 174/66; 174/480; 174/481; 220/3.3; 439/135

(58) Field of Classification Search ................ 174/48, 174/49, 50, 53, 58, 57, 135, 66, 67, 495, 174/504; 220/3.2, 3.3, 3.4, 3.5, 3.6, 3.7, 220/3.8, 3.9, 4.02; 248/906; 439/135, 137, 439/136, 145, 535, 536; 385/134, 135; 200/333
See application file for complete search history.

(56) References Cited

U.S. PATENT DOCUMENTS

| | | | |
|---|---|---|---|
| 2,855,578 A * | 10/1958 | Hirsch ........................ | 174/66 |
| 2,916,733 A | 12/1959 | Hirsch | |
| 4,508,933 A | 4/1985 | Carvel | |
| 4,530,555 A * | 7/1985 | South ........................ | 439/135 |
| D283,007 S | 3/1986 | Henkel | |
| 4,652,696 A * | 3/1987 | Winnick ..................... | 174/67 |
| 4,915,638 A | 4/1990 | Domian | |
| 4,950,842 A * | 8/1990 | Menninga ................... | 174/67 |
| 5,252,083 A | 10/1993 | Correnti | |
| 5,304,736 A * | 4/1994 | Halfacre ..................... | 174/48 |
| 5,317,108 A * | 5/1994 | Prairie, Jr. .................. | 174/67 |
| 5,357,053 A * | 10/1994 | Manaras ..................... | 174/48 |
| 5,369,548 A * | 11/1994 | Combs ....................... | 200/333 |
| 5,556,289 A * | 9/1996 | Holbrook, Jr. ............. | 439/135 |
| 5,661,263 A * | 8/1997 | Salvaggio ................... | 174/48 |
| 5,912,432 A | 6/1999 | Thomas | |
| 6,457,843 B1 * | 10/2002 | Kester et al. .............. | 439/136 |

* cited by examiner

Primary Examiner—Angel R. Estrada

(57) ABSTRACT

An electrical outlet covering apparatus includes a housing that has a back wall and a peripheral wall. The back wall has a pair of openings extending therethrough that are alignable with one of a pair of female outlets. The peripheral wall includes has a bottom wall that has a slot therein. A covering includes a front wall and a perimeter wall that is attached to and extends away from the front wall. The perimeter wall has an inner surface defining a cavity for receiving the housing. The covering is removably positionable on and over the housing. The perimeter wall has a notch therein that is aligned with the slot when the covering is positioned on the housing. A male power plug may be plugged into one of the female wall outlets and a cord attached thereto extended downwardly through the slot and notch.

4 Claims, 5 Drawing Sheets

US 7,164,083 B1

ELECTRICAL OUTLET COVERING APPARATUS

BACKGROUND OF THE INVENTION

1. Field of the Invention

The present invention relates to outlet covering devices and more particularly pertains to a new outlet covering device for covering and protecting an outlet having a plug therein from a child without interfering with the use of the outlet.

2. Description of the Prior Art

The use of outlet covering devices is known in the prior art. U.S. Pat. No. 5,252,083 describes a device for covering an outlet while still allowing plugs to be retained therein. Another type of outlet covering device is U.S. Pat. No. 4,915,638 that includes a housing positionable over an outlet and a plug attached thereto. Still yet another such covering is found in U.S. Pat. No. 5,912,432.

While these devices fulfill their respective, particular objectives and requirements, the need remains for a device that includes not only a covering for an outlet but also a guide for receiving a cord that is plugged into the outlet and that extends away from the outlet. This will prevent an outlet covering from being removed by simply pulling on a loose portion of the cord.

SUMMARY OF THE INVENTION

The present invention meets the needs presented above by generally comprising a housing that has a back wall and a peripheral wall that is attached to and extends away from the back wall. The back wall has a pair of openings extending therethrough. Each of the openings is alignable with one of a pair of female outlets when the back wall is abutted against a wall containing the female outlets. A coupler removably secures the back wall to the female wall outlets. The peripheral wall includes has a bottom wall that has a slot therein. A covering includes a front wall and a perimeter wall that is attached to and extends away from the front wall. The perimeter wall has an inner surface defining a cavity for receiving the housing. The covering is removably positionable on and over the housing. The perimeter wall has a notch therein that is aligned with the slot when the covering is positioned on the housing. A cord guide is attached to and extends away from said perimeter wall. The guide extends downwardly away from the perimeter wall when the covering is positioned on the housing. The cord guide extends along an edge of the notch. A male power plug may be plugged into one of the female wall outlets and a cord attached thereto extended downwardly through the slot and notch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularly in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
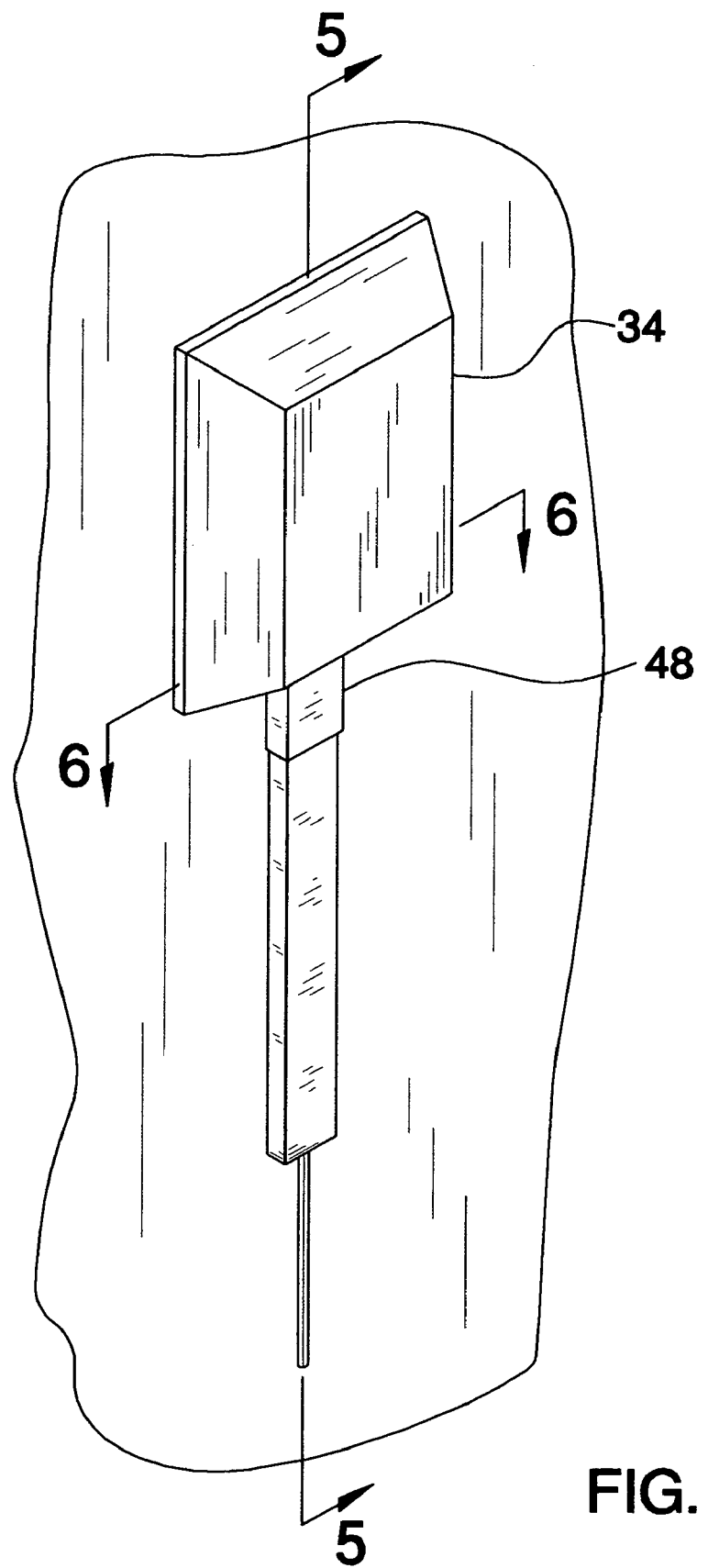
FIG. 1 is a perspective view of a electrical outlet covering apparatus according to the present invention.
Figure 2:
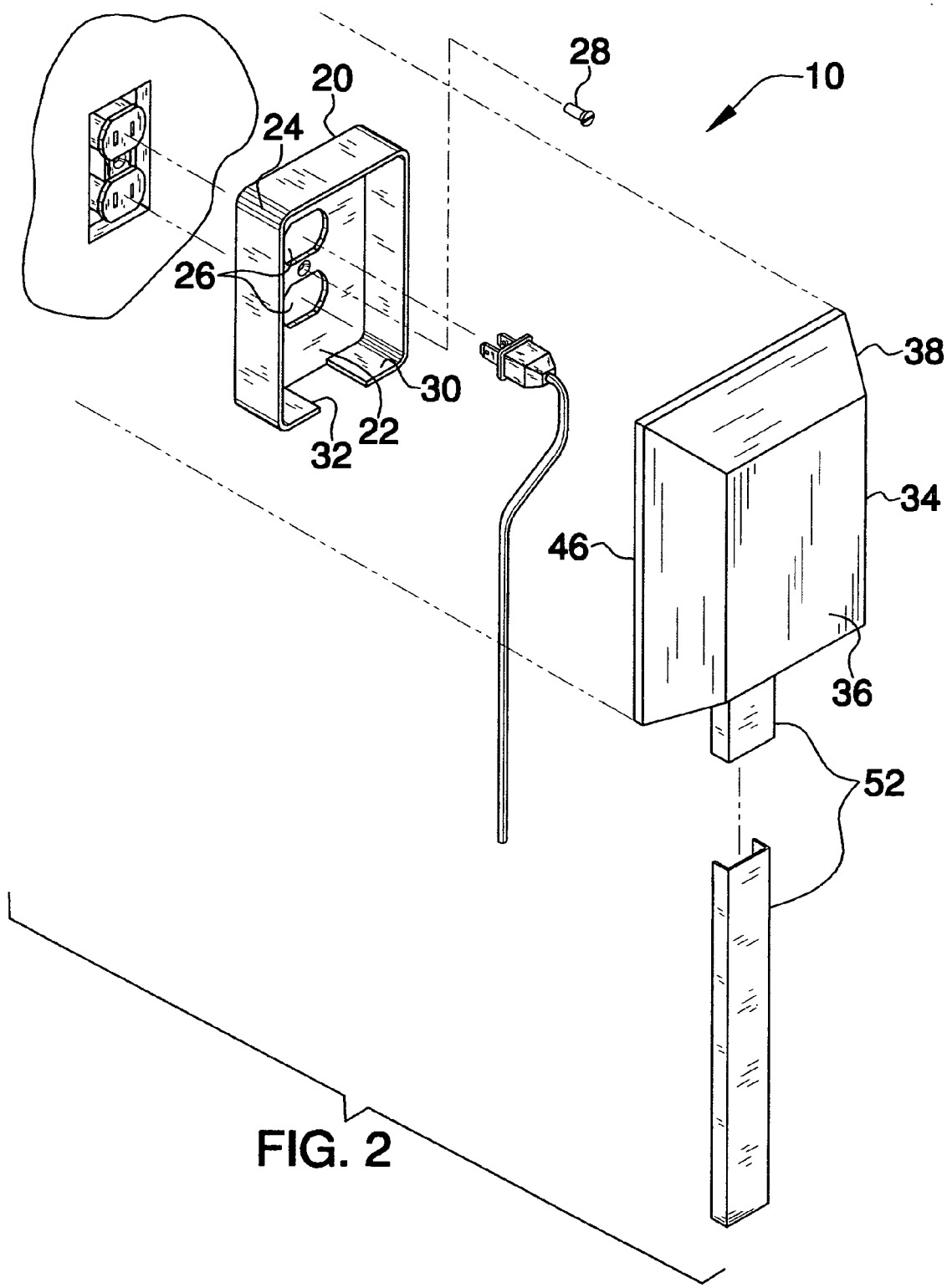
FIG. 2 is a perspective view of the present invention.
Figure 4:
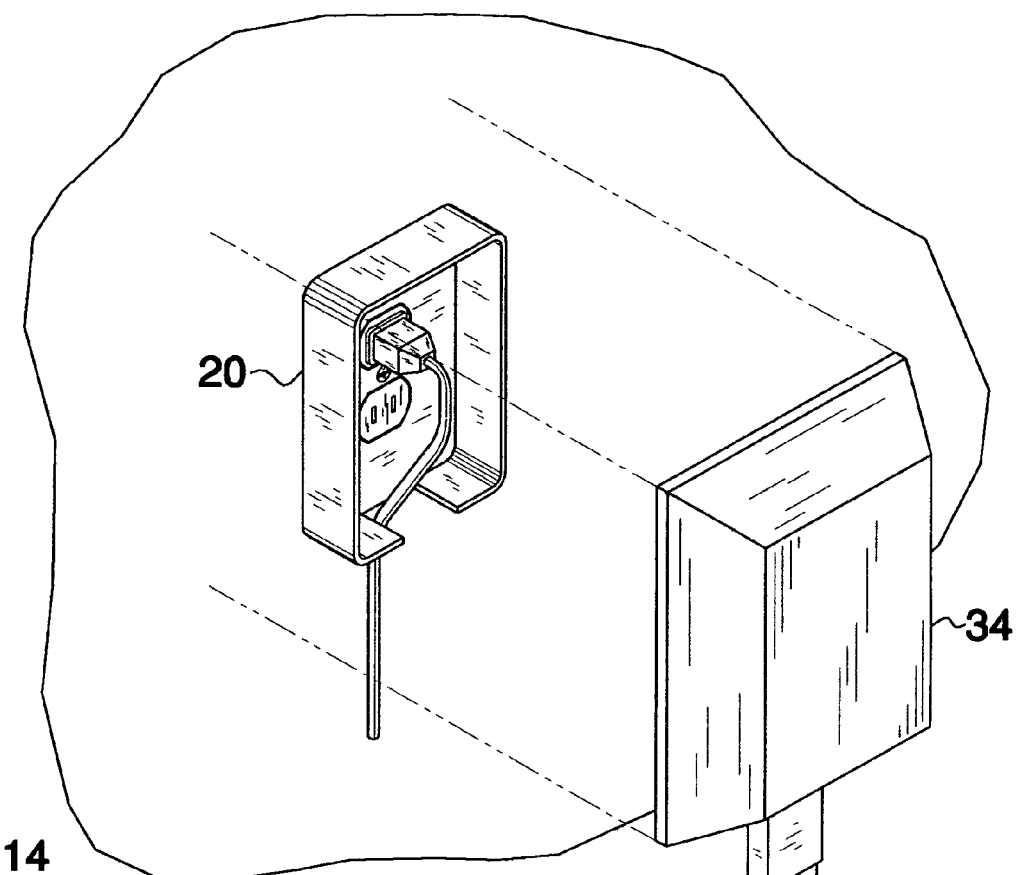
FIG. 4 is a perspective view of the present invention.

With reference now to the drawings, and in particular to FIGS. 1 through 6 thereof, a new outlet covering device embodying the principles and concepts of the present invention and generally designated by the reference numeral 10 will be described.

Figure 3:
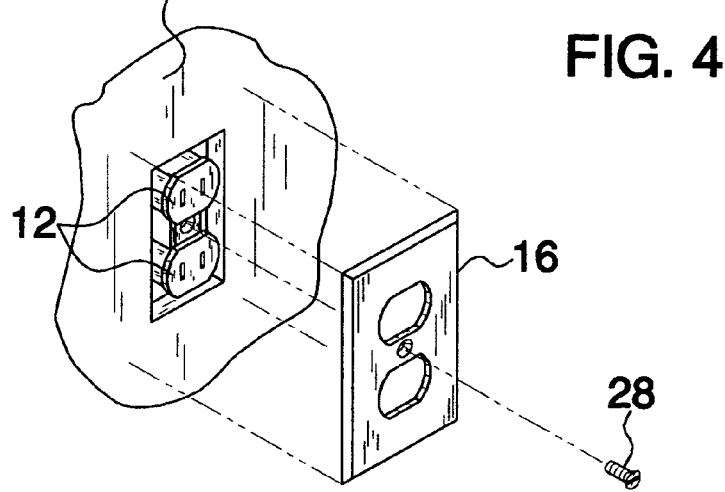
FIG. 3 is a perspective view of a conventional outlet cover.
Figure 5:
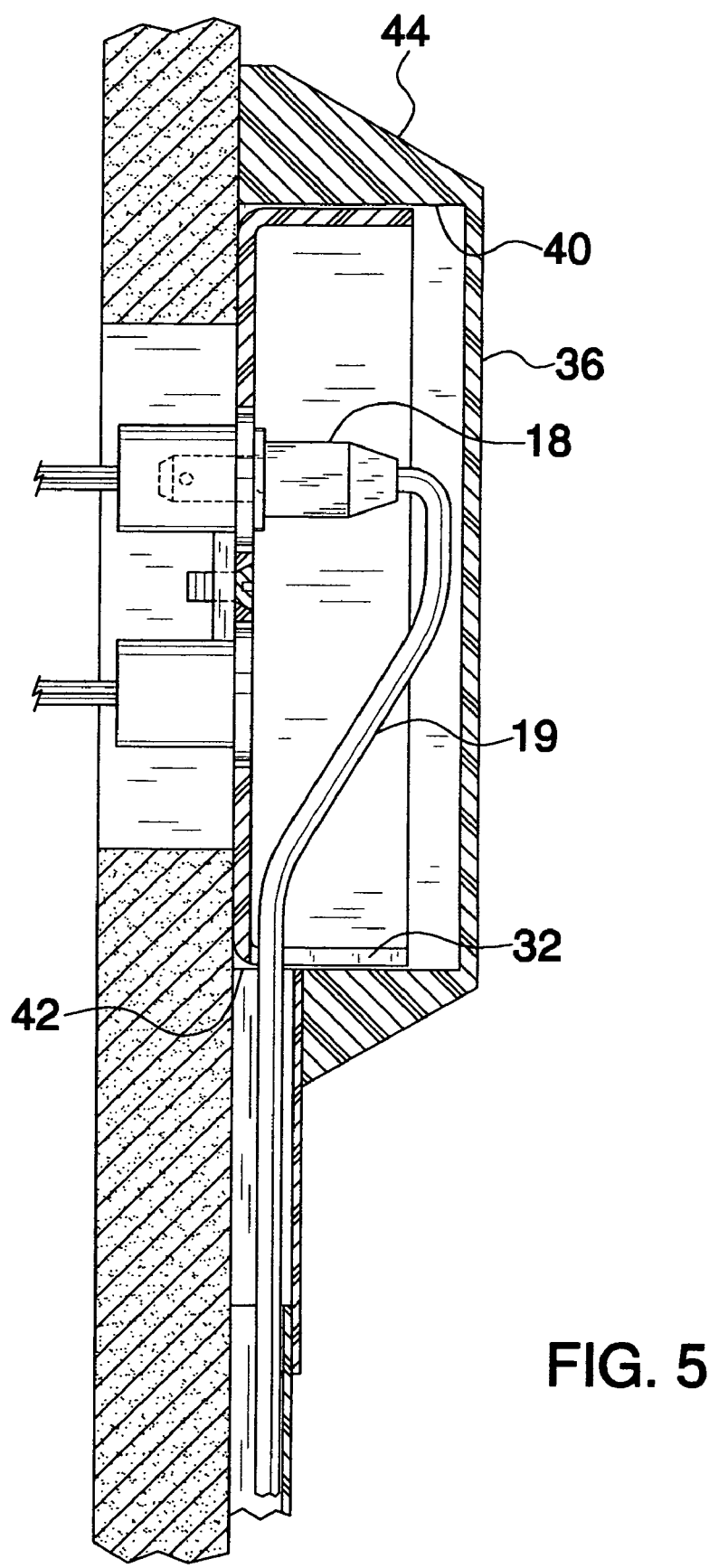
FIG. 5 is a cross-sectional view taken along line 5—5 of FIG. 1 of the present invention.
Figure 6:
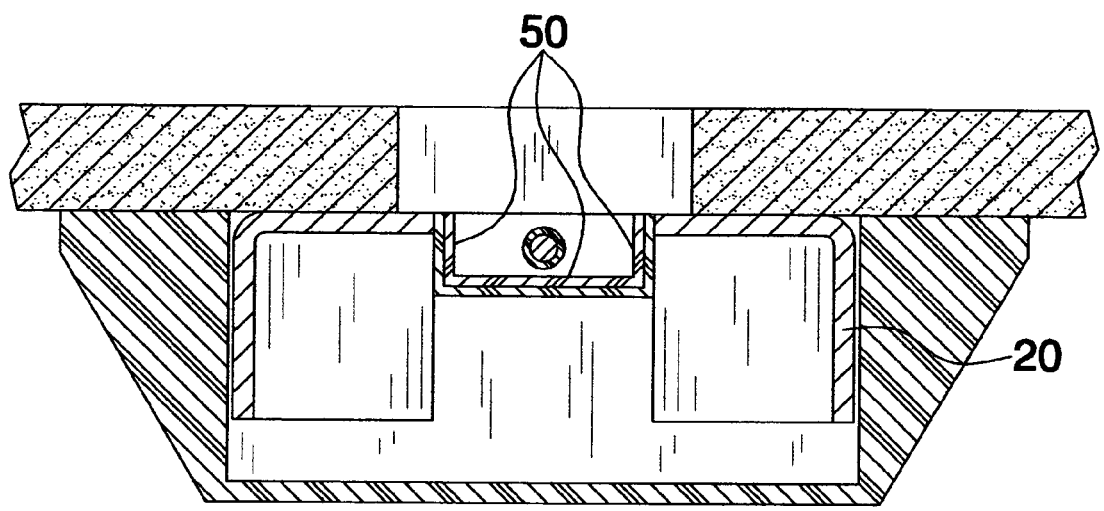
FIG. 6 is a cross-section view taken along line 6—6 of FIG. 1 of the present invention.

As best illustrated in FIGS. 1 through 6, the electrical outlet covering apparatus 10 generally comprises a device that is positionable over a pair of female wall outlets 12 positioned in a wall 14. A conventional cover 16 is shown in FIG. 3, which must be removed in order to use the apparatus 10. The female wall outlets 12 are conventional. The assembly 10 includes a housing 20 that has a back wall 22 and a peripheral wall 24 that is attached to and extends away from the back wall 22. The back wall 22 has a pair of openings 26 extending therethrough. Each of the openings 26 is alignable with one of the outlets 12 when the back wall 24 is abutted against the dwelling wall 14. A coupler 28, such as a conventional screw, is removably extended through and secures the back wall 24 to the female wall outlets 12. The peripheral wall 24 includes a bottom wall 30 that has a slot 32 therein.

A covering 34 includes a front wall 36 and a perimeter wall 38 that is attached to and extends away from the front wall 36. The perimeter wall 38 has an inner surface 40 that defines a cavity for receiving the housing 20. The covering 20 is removably positionable on and over the housing 20. The perimeter wall 38 has a notch 42 therein. The notch 42 is aligned with the slot 32 when the covering 34 is positioned on the housing 20. The inner surface 40 is frictionally couplable to the peripheral wall 24. An outer surface 44 of the perimeter wall 38 is angled outwardly from front wall 36 to a free edge 46 of the perimeter wall 38.

A cord guide 48 is attached to and extends away from the perimeter wall 38. The guide 48 extends downwardly away from the perimeter wall 38 when the covering 34 is positioned on the housing 20. The cord guide 38 extends along an edge of the notch 42 and includes a three boundary walls 50 extending downwardly from the perimeter wall 38. The cord guide 48 may include telescoping sections 52 to account for different distances between the female outlet 12 and a floor surface.

In use, a male power plug 18 may be plugged into one of the female wall outlets 12 and a cord 19 attached thereto extended downwardly through the slot 32 and notch 42. The cord 19 may then be extended down the cord guide 48. The covering 34 is angled outwardly to make it difficult to grasp, particularly for a child. The apparatus 10 prevents a child from having access to outlets 12 having a power cord plugged therein and prevents removal of the covering 34 by pulling on the cord 19.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical outlet covering assembly, said assembly being positionable over a pair of female wall outlets positioned in a dwelling wall, said assembly comprising:

a housing having a back wall and a peripheral wall being attached to and extending away from said back wall, said peripheral wall being coextensive with a peripheral edge of said back wall, said back wall having a pair of openings extending therethrough, each of said openings being alignable with one of said outlets when said back wall is abutted against the dwelling wall, a coupler removably secures said back wall to the female wall outlets, said peripheral wall including a bottom wall having a slot therein;

a covering including a front wall and a perimeter wall being attached to and extending away from said front wall, said perimeter wall having an inner surface defining a cavity for receiving said housing, said covering being removably positionable on and over said housing, said covering being frictionally coupled to said housing and being completely removable from said housing to allow selective positioning of said front wall with respect to said back wall, said perimeter wall having a notch therein, said notch being aligned with said slot when said covering is positioned on said housing;

a cord guide being attached to and extending away from said perimeter wall, said guide extending downwardly away from said perimeter wall when said covering is positioned on said housing, said cord guide extending along an edge of said notch; and wherein a male power plug may be plugged into one of the female wall outlets and extended downwardly through said slot and notch.

2. The assembly according to claim 1, wherein an outer surface of said perimeter wall is angled outwardly from front wall to a free edge of said perimeter wall.

3. The assembly according to claim 1, wherein said cord guide is telescoping.

4. An electrical outlet covering assembly, said assembly being positionable over a pair of female wall outlets positioned in a dwelling wall, said assembly comprising:

a housing having a back wall and a peripheral wall being attached to and extending away from said back wall, said peripheral wall being coextensive with a peripheral edge of said back wall, said back wall having a pair of openings extending therethrough, each of said openings being alignable with one of said outlets when said back wall is abutted against the dwelling wall, a coupler being removably extended through and securing said back wall to the female wall outlets, said peripheral wall including a bottom wall having a slot therein;

a covering including a front and a perimeter wall being attached to and extending away from said front wall, said perimeter wall having an inner surface defining a cavity for receiving said housing, said covering being removably positionable on and over said housing, said perimeter wall having a notch therein, said notch being aligned with said slot when said covering is positioned on said housing, said inner surface being frictionally couplable to said peripheral wall to allow selective positioning of said front wall with respect to said back wall, an outer surface of said perimeter wall being angled outwardly from front wall to a free edge of said perimeter wall;

a cord guide being attached to and extending away from said perimeter wall, said guide extending downwardly away from said perimeter wall when said covering is positioned on said housing, said cord guide extending along an edge of said notch; and wherein a male power may be plugged into one of the female wall outlets and a cord attached thereto extended downwardly through said slot and notch.

* * * * *